(12) United States Patent
Wang et al.

(10) Patent No.: US 12,112,227 B2
(45) Date of Patent: Oct. 8, 2024

(54) PRODUCT IDENTIFICATION METHOD AND PASSAGE, CONTROL DEVICE, AND PRODUCT SETTLEMENT PASSAGE

(71) Applicant: BEIJING JINGDONG QIANSHI TECHNOLOGY CO., LTD., Beijing (CN)

(72) Inventors: Hongwei Wang, Beijing (CN); Yongli Ren, Beijing (CN); Xiangzhong Kong, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 687 days.

(21) Appl. No.: 17/293,762

(22) PCT Filed: Aug. 2, 2019

(86) PCT No.: PCT/CN2019/099078
§ 371 (c)(1),
(2) Date: May 13, 2021

(87) PCT Pub. No.: WO2020/125020
PCT Pub. Date: Jun. 25, 2020

(65) Prior Publication Data
US 2022/0012442 A1  Jan. 13, 2022

(30) Foreign Application Priority Data
Dec. 18, 2018 (CN) .......................... 201811545577.5

(51) Int. Cl.
*G06K 7/10* (2006.01)
(52) U.S. Cl.
CPC .......... *G06K 7/10425* (2013.01); *G06K 7/10* (2013.01); *G06K 7/10089* (2013.01); *G06K 7/10356* (2013.01); *G06K 7/10475* (2013.01)

(58) Field of Classification Search
CPC .......... G06K 7/10425; G06K 7/10089; G06K 7/10356; G06K 7/10475; G06K 15/00;
(Continued)

(56) References Cited

U.S. PATENT DOCUMENTS 4,016,553 A * 4/1977 Novikoff ................ G01V 3/104
                                                        340/572.9
5,013,896 A * 5/1991 Ono ...................... G07G 1/0036
                                                        235/377
(Continued)

FOREIGN PATENT DOCUMENTS

CN          105593847 A      5/2016
CN          107077686 A      8/2017
(Continued)

OTHER PUBLICATIONS

Extended European Search Report issued Jun. 21, 2022 in European Patent Application No. 19900053.0, 7 pages.
(Continued)

*Primary Examiner* — Van T Trieu
(74) *Attorney, Agent, or Firm* — Oblon, McClelland, Maier & Neustadt, L.L.P.

(57) ABSTRACT

A product identification method comprises instructing an antenna in a product verification area to collect first product identification data of identified products in the case where a user enters the product verification area of a product identification passage; instructing the antenna in the product verification area to collect product verification data of identified products in the case where a user enters a product settlement area of the product identification passage; and determining user product data based on the first product identification data and the product verification data. A prod-
(Continued)

uct verification area is provided to eliminate a tag outside the passage being falsely read and reduce a tag false reading probability.

19 Claims, 8 Drawing Sheets

(58) Field of Classification Search
CPC .......... G06K 7/10; G06Q 10/00; G06Q 10/08; G06Q 20/00; G06Q 20/047; G06Q 30/00; G06Q 30/06; G06Q 30/0633
See application file for complete search history.

(56) References Cited

U.S. PATENT DOCUMENTS

| | | | |
|---|---|---|---|
| 5,745,036 A * | 4/1998 | Clare | G08B 13/2445 340/572.1 |
| 9,519,811 B1 | 12/2016 | Simon et al. | |
| 2006/0213992 A1 | 9/2006 | Ishikawa | |
| 2012/0212327 A1 | 8/2012 | Torabi | |
| 2012/0280040 A1 * | 11/2012 | Carney | G06Q 20/047 235/383 |
| 2014/0166745 A1 * | 6/2014 | Graef | G07F 19/00 235/379 |
| 2015/0012396 A1 * | 1/2015 | Puerini | G06V 20/52 705/28 |
| 2016/0189286 A1 | 6/2016 | Zohar et al. | |
| 2017/0176986 A1 | 6/2017 | High et al. | |
| 2017/0308764 A1 | 10/2017 | Higa | |
| 2018/0096331 A1 | 4/2018 | Patil et al. | |

FOREIGN PATENT DOCUMENTS

| | | | | |
|---|---|---|---|---|
| CN | 107358433 | A | 11/2017 | |
| CN | 107394388 | A | 11/2017 | |
| CN | 107464116 | A | 12/2017 | |
| CN | 107665545 | * | 2/2018 | ............. G07F 9/002 |
| CN | 107665545 | A | 2/2018 | |
| CN | 107871372 | A | 4/2018 | |
| CN | 108039010 | A | 5/2018 | |
| CN | 108182744 | A | 6/2018 | |
| CN | 108389337 | A | 8/2018 | |
| CN | 108460440 | A | 8/2018 | |
| CN | 108520409 | A | 9/2018 | |
| CN | 108537302 | A | 9/2018 | |
| CN | 207965926 | U | 10/2018 | |
| CN | 208188867 | U | 12/2018 | |
| JP | 2005-165505 | A | 6/2005 | |
| WO | WO 2018/194174 | A1 | 10/2018 | |

OTHER PUBLICATIONS

Office Action issued May 15, 2023, in corresponding Japanese Patent Application No. 2021-521969 (with English Translation), 6 pages.
International Search Report issued on Oct. 29, 2019 in PCT/CN2019/099078 filed on Aug. 2, 2019, 3 pages.
Combined Chinese Office Action and Search Report issued on Feb. 1, 2021 in Chinese Patent Application No. 201811545577.5 filed on Dec. 18, 2018, 6 pages.

* cited by examiner

PRODUCT IDENTIFICATION METHOD AND PASSAGE, CONTROL DEVICE, AND PRODUCT SETTLEMENT PASSAGE

CROSS-REFERENCE TO RELATED APPLICATIONS

The present application is based on and claims the benefit of priority to China Patent Application No. 201811545577.5 filed on Dec. 18, 2018, which is incorporated by reference herein in its entirety into the present application.

TECHNICAL FIELD

The present disclosure relates to the field of product identification, and in particular to a product identification method and passage, a control device, and a product settlement passage.

BACKGROUND

Since the first unmanned supermarket was opened, unmanned supermarkets have sprung up everywhere.

With the advantages such as 24-hour operation mode, convenient and fast shopping experience and high-tech demonstration, the unmanned supermarket indeed satisfies the living needs of most people, especially the young generation.

At present, unmanned convenience stores in related technologies substantially have the following four technical forms: the first is two-dimensional code scanning technology which is relatively simple and traditional; the second is RFID (Radio Frequency Identification) tag identification technology; the third is the visual identity technology based on convolutional neural network; the fourth is a hybrid technology of video identification and sensors based on visual identity, which is relatively complicated and difficult to be implemented.

For the identification of products, unmanned supermarkets in related technologies mostly use RFID tags. RFID identifies specific targets and read and write related data by radio signals, without establishing physical contact between the identification system and specific targets. A RFID tag is affixed to each product to identify the products purchased by customers and perform settlements in the "settlement passage". When the customer leaves the supermarket, the sensor may scan the RFID tag and reconfirms the products purchased by the consumer, and automatically performs settlement on the consumer's account.

SUMMARY

According to one aspect of the present disclosure, a product identification method is provided. The method comprises: instructing an antenna in a product verification area to collect first product identification data of identified products in the case where a user enters the product verification area of a product identification passage; instructing the antenna in the product verification area to collect product verification data of identified products in the case where a user enters a product settlement area of the product identification passage; and determining user product data based on the first product identification data and the product verification data.

In some embodiments of the present disclosure, the product verification area is arranged at an entrance of the product identification passage, and the product settlement area is arranged at an exit of the product identification passage.

In some embodiments of the present disclosure, the determining the user product data based on the first product identification data and the product verification data comprises: taking a difference set between the first product identification data and the product verification data as the user product data.

In some embodiments of the present disclosure, the product identification method further comprises: instructing an antenna in a product identification area to collect second product identification data of identified products in the case where the user enters the product identification area of the product identification passage, wherein the product identification area is arranged between the product verification area and the product settlement area.

In some embodiments of the present disclosure, the determining the user product data based on the first product identification data and the product verification data comprises: determining the user product data based on the first product identification data, the second product identification data and the product verification data.

In some embodiments of the present disclosure, the determining the user product data based on the first product identification data, the second product identification data and the product verification data comprises: calculating a union set of the first product identification data and the second product identification data; and taking a difference set between the union set and the product verification data as the user product data.

In some embodiments of the present disclosure, the product identification method further comprises: determining that a user enters the product verification area in the case of receiving a trigger signal of a first photoelectric switch, wherein the first photoelectric switch is arranged at the entrance of the product identification passage.

In some embodiments of the present disclosure, the product identification method further comprises: determining that a user enters the product identification area, and instructing the antenna in the product verification area to turn off in the case of receiving a trigger signal of a second photoelectric switch, wherein the second photoelectric switch is arranged between the product verification area and the product identification area of the product identification passage.

In some embodiments of the present disclosure, the product identification method further comprises: determining that a user enters the product settlement area in the case of receiving a trigger signal of a third photoelectric switch, wherein the third photoelectric switch is arranged in front of the product settlement area of the product identification passage.

In some embodiments of the present disclosure, the product identification method further comprises: determining that a user has left the product settlement area, instructing the antenna in the product verification area to turn off, and completing the product settlement based on the user product data in the case of receiving a trigger signal of a fourth photoelectric switch, wherein the fourth photoelectric switch is arranged at the exit of the product identification passage.

According to another aspect of the present disclosure, a control device is provided. The control device comprises: a process control unit configured to determine whether a user enters a product verification area or a product settlement area of a product identification passage; a product identification unit configured to instruct the antenna in the product verification area to collect first product identification data of identified products in the case where the process control unit determines that a user enters the product verification area of the product identification passage, and to instruct an antenna in the product verification area to collect product verification data of identified products in the case where the process control unit determines that the user enters the product settlement area of the product identification passage, and to instruct an antenna in the product verification area to collect product verification data of identified products in the case where the process control unit determines that the user enters the product settlement area of the product identification passage; and a data processing unit configured to determine the user product data based on the first product identification data and the product verification data.

In some embodiments of the present disclosure, the control device is configured to perform operations for implementing the product identification method according to any one of the above-described embodiments.

According to another aspect of the present disclosure, a control device is provided. The control device comprises: a memory configured to store instructions; and a processor configured to execute the instructions, so that the control device performs operations for implementing the product identification method according to any one of the above-described embodiments.

According to another aspect of the present disclosure, a product identification passage is provided. The product identification passage comprises two passage walls, within which a product verification area and a product settlement area are arranged; a control device; and an antenna in the product verification area, wherein the control device is configured to instruct the antenna in the product verification area to collect first product identification data of identified products in the case where a user enters the product verification area of the product identification passage, instruct the antenna in the product verification area to collect product verification data of identified products in the case where a user enters the product settlement area of the product identification passage, and determine user product data based on the first product identification data and the product verification data.

In some embodiments of the present disclosure, the control device is the control device according to any one of the above-described embodiments.

In some embodiments of the present disclosure, the product identification passage further comprises a product identification area and an antenna in the product identification area, wherein: the product identification area is arranged between the product verification area and the product settlement area; and the control device is further configured to instruct the antenna in the product identification area to collect second product identification data of identified products in the case where a user enters the product identification area of the product identification passage, and determine the user product data based on the first product identification data, the second product identification data and the product verification data.

In some embodiments of the present disclosure, the antenna in the product identification area comprises a plurality of antennas in the product identification area, wherein the plurality of antennas in the product identification area have at least one of the following settings: the plurality of antennas in the product identification area are spaced at predetermined height intervals; the antenna surfaces of the plurality of antennas in the product identification area are installed at a predetermined angle with respect to the passage wall; the plurality of antennas in the product identification area have a polling operation controlled by the control device; or the plurality of antennas in the product identification area are all the same type of circular polarization antenna.

In some embodiments of the present disclosure, the plurality of antennas in the product identification area comprise a first antenna, a second antenna, a third antenna, and a fourth antenna, wherein the first antenna is opposite to the third antenna at the same height, and the second antenna is opposite to the fourth antenna at the same height.

In some embodiments of the present disclosure, the antenna in the product verification area is further configured to read a readable tag outside the passage.

In some embodiments of the present disclosure, the antenna in the product verification area has at least one of the following settings: the pattern of the antenna in the product verification area has a front-to-rear ratio greater than a predetermined value; or the antenna in the product verification area has a port output power lower than that of the antenna in the product identification areas.

In some embodiments of the present disclosure, the product identification passage further comprises at least one of a first photoelectric switch, a second photoelectric switch, a third photoelectric switch or a fourth photoelectric switch, wherein: the first photoelectric switch is arranged at the entrance of the product identification passage, and is configured to detect whether the user enters the product verification area, and send a trigger signal to the control device in the case where the user enters the product verification area; the second photoelectric switch is arranged between the product verification area and the product identification area of the product identification passage, and is configured to detect whether the user enters the product identification area, and send a trigger signal to the control device in the case where the user enters the product identification area; the third photoelectric switch is arranged in front of the product settlement area of the product identification passage, and is configured to detect whether the user enters the product settlement area, and send a trigger signal to the control device in the case where the user enters the product settlement area; and the fourth photoelectric switch is arranged at the exit of the product identification passage, and is configured to detect whether a user leaves the product settlement area, and send a trigger signal to the control device in the case where the user leaves the product settlement area.

According to another aspect of the present disclosure, a product settlement passage is provided. The product settlement passage comprising: the product identification passage according to any one of the above-described embodiments, including a control device; and an identity identification apparatus arranged in the product settlement area of the product identification passage, and configured to identify the identity of a user and send the identity information of the user to a control device of the product identification passage, wherein the control device of the product identification passage is configured to bind user product data with the identity of the user to complete product settlement.

In some embodiments of the present disclosure, the product settlement passage further comprises a gate, wherein the control device of the product identification passage is also configured to instruct the gate to open after the product settlement is completed. According to another aspect of the present disclosure, a computer readable storage medium is provided. The computer readable storage medium stores computer instructions, which, when executed by a processor, implement the product identification method according to any one of the above-described embodiments.

BRIEF DESCRIPTION OF THE DRAWINGS

In order to more clearly explain the embodiments of the present disclosure or the technical solutions in the relevant art, a brief introduction will be given below for the drawings required to be used in the description of the embodiments or the relevant art. It is obvious that, the drawings illustrated as follows are merely some of the embodiments of the present disclosure. For those skilled in the art, they may also acquire other drawings according to such drawings on the premise that no inventive effort is involved.

DETAILED DESCRIPTION

Figure 1:
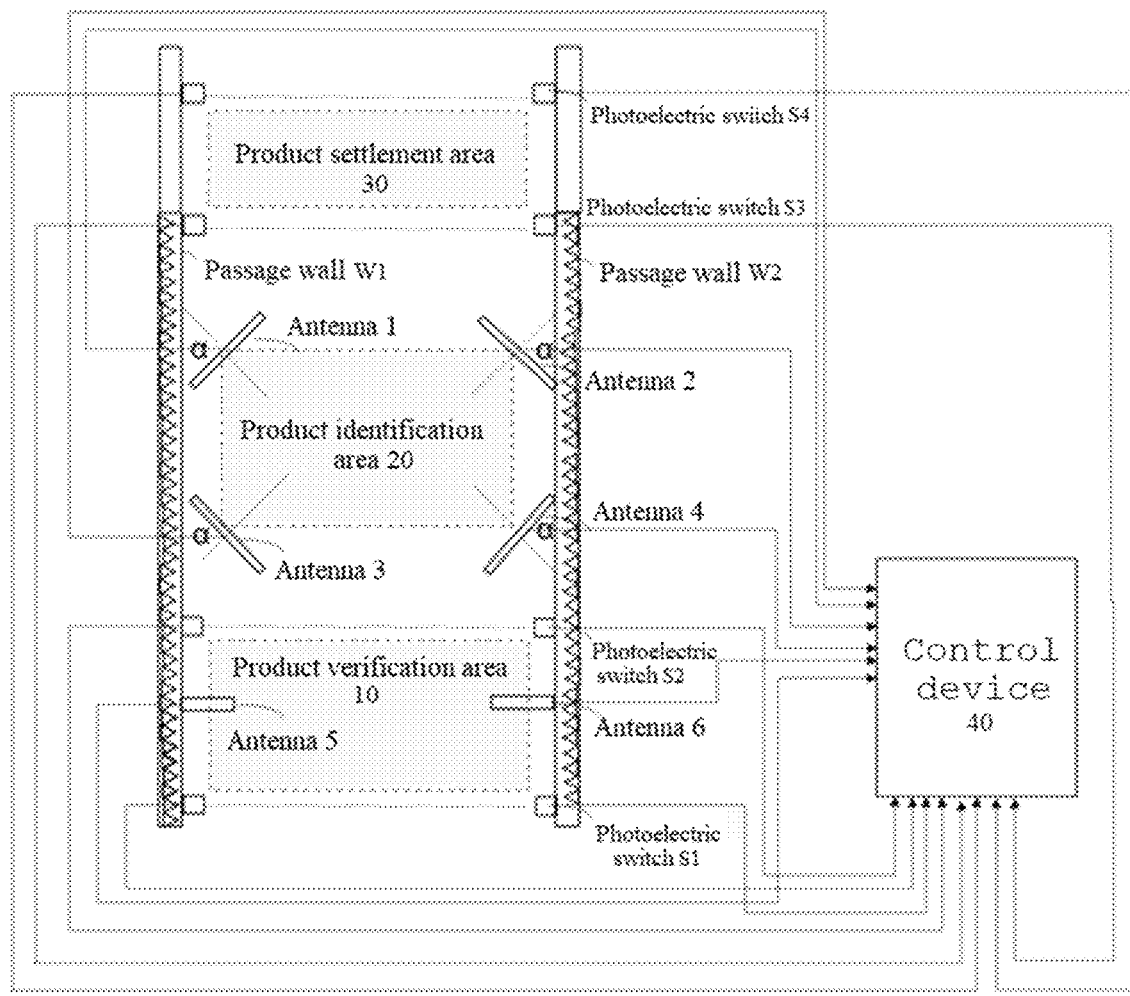
FIG. 1 is a schematic view of some embodiments of the product identification passage of the present disclosure.

Next, the technical solution in the embodiments of the present disclosure will be explicitly and completely described in combination with the drawings in the embodiments of the present disclosure. Apparently, the described embodiments are merely part of the embodiments of the present disclosure, rather than all the embodiments. The following descriptions of at least one exemplary embodiment which are in fact merely descriptive, by no means as any delimitation on the present disclosure as well as its application or use. On the basis of the embodiments of the present disclosure, all the other embodiments acquired by a person skilled in the art on the premise that no inventive effort is involved fall into the scope protected by the present disclosure.

Unless additionally specified, the relative arrangements, numerical expressions and numerical values of the components and steps expounded in these examples do not limit the scope of the present invention.

At the same time, it should be understood that, in order to facilitate the description, the dimensions of various parts shown in the drawings are not delineated according to actual proportional relations.

The techniques, methods, and apparatuses known to a common technical person in the relevant art may not be discussed in detail, but where appropriate, techniques, methods, and apparatuses should be considered as part of the granted description.

Among all the examples shown and discussed here, any specific value should be construed as being merely illustrative, rather than as a delimitation. Thus, other examples of exemplary embodiments may have different values.

It should be noted that similar reference signs and letters present similar items in the following drawings, and therefore, once an item is defined in a drawing, there is no need for further discussion in the subsequent drawings.

The product identification passage based on RFID technology is present with two forms in related technologies: a closed passage and an open passage, wherein, the closed passage has favorable properties of preventing false reading and absent reading, but has a poor customer experience; the open passage attains more and more attention from suppliers owing to its favorable customer experience.

Absent reading is one of the key problems that is mainly being solved in related technologies. The reason for an absent reading phenomenon lies in that: first, there is an identification dead spot within the passage; second, there is a poor sensitivity in the tag on the product. Currently, there are mainly three solutions: firstly, to increase the sensitivity of the tag and reduce a minimum wake-up power of the tag; secondly, to increase the signal strength of the reader; thirdly, to improve the settings of the signal field so as to avoid a dead spot by electromechanical collaboration.

In addition, the identification distance of a RFID tag is related to its power, sensitivity, and antenna size. If the identification distance within the passage is too long, false reading is prone to occur, and if the identification distance is too short, absent reading is prone to occur. How to balance false reading and absent reading is a technical problem in the dedicated product identification passage for the unmanned supermarket.

In view of at least one of the above technical problems, the present disclosure provides a product identification method and passage, a control device and a product settlement passage, wherein a product verification area is provided to eliminate tags falsely read outside the passage and reduce the false reading probability of the tags.

FIG. 1 is a schematic view of some embodiments of the product identification passage of the present disclosure. As shown in FIG. 1, the product identification passage comprises two passage walls (W1,W2), and a product verification area 10, a product identification area 20 and a product settlement area 30 are sequentially arranged within the passage walls from the passage entrance to the passage exit.

Various constituent parts of the product identification passage of the present disclosure will be described below in conjunction with the accompanying drawings.

1. Passage Wall

The product identification passage of the present disclosure is an open passage, wherein the body structure of the product identification passage of the present disclosure consists in two passage walls (a passage wall W1 and a passage wall W2 as shown in FIG. 1).

In some embodiments of the present disclosure, an electromagnetic wave absorbing material is loaded within the passage wall. Accordingly, the passage wall can absorb redundant electromagnetic fields, reduce electromagnetic reflection within the passage, limit unstable electromagnetic radiation, and produce the effect of purifying the electromagnetic environment of the passage.

In some embodiments of the present disclosure, a gate and an identity identification apparatus may be installed at the passage exit. The product identification passage of the present disclosure combines the gate and the identity identification apparatus to collectively form the product settlement passage of the present disclosure. Since the above-described embodiments of the present disclosure mainly describe the product identification function, the functions of the gate and the identity identification apparatus will not be elaborated in detail here.

2. Antenna in the Product Identification Area

In some embodiments of the present disclosure, as shown in FIG. 1, the antenna in the product identification areas are arranged inside the passage.

In some embodiments of the present disclosure, the antenna in the product identification area may comprise a plurality of antennas in the product identification area, wherein: the plurality of antennas in the product identification area are spaced at predetermined height intervals Δh to reduce mutual interference between the antennas.

In some embodiments of the present disclosure, the antenna surfaces of the plurality of antennas in the product identification area are installed at a predetermined angle α with respect to the passage wall.

In some embodiments of the present disclosure, the predetermined angle α may be 45°.

In some embodiments of the present disclosure, as shown in FIG. 1, the plurality of antennas in the product identification area are connected to a control device outside the passage through radio frequency cables.

In some embodiments of the present disclosure, the control device controls a polling operation of the plurality of antennas in the product identification area, and the antennas have a controllable switching rate.

In some embodiments of the present disclosure, the plurality of antennas in the product identification area may all be the same type of circular polarization antenna.

In some embodiments of the present disclosure, the horizontal half-power lobe angles of the plurality of antennas in the product identification area may all be 90°, and the vertical half-power lobe angles may all be 60°.

Figure 2:
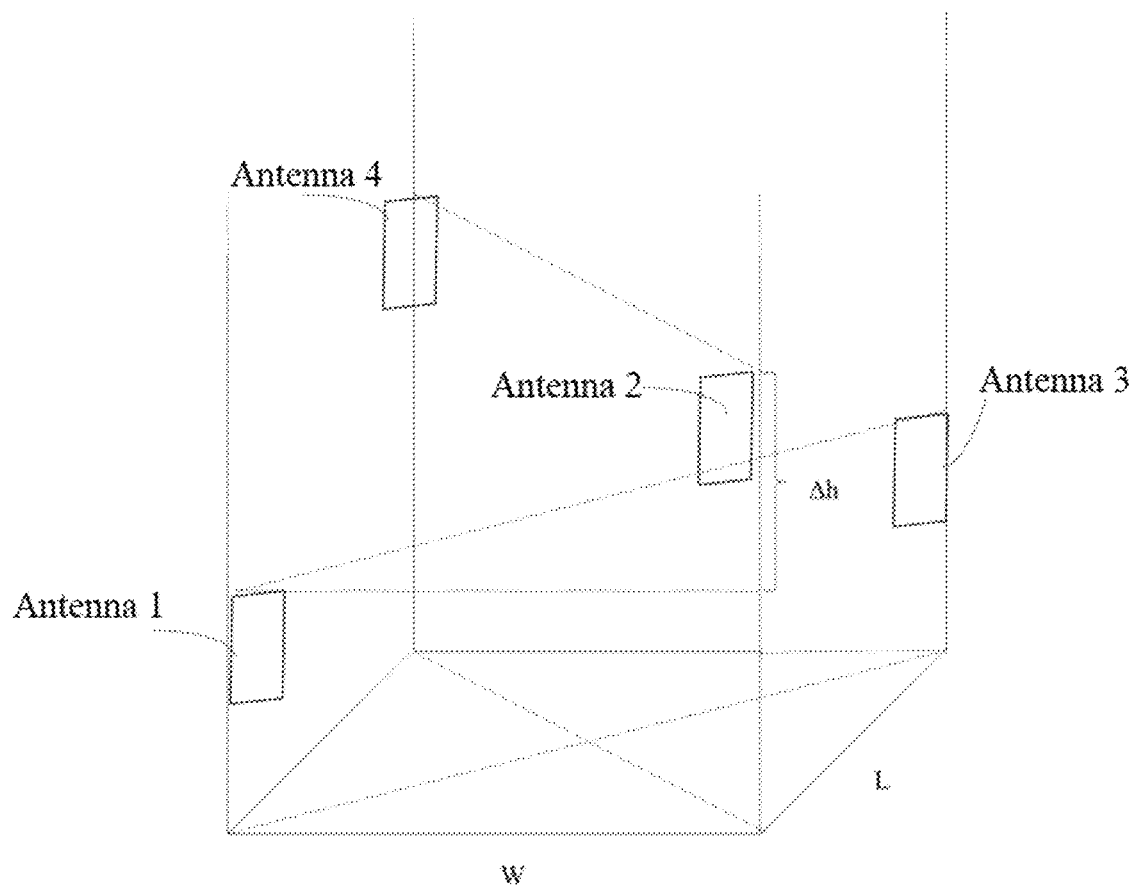
FIG. 2 is a schematic view of an installation structure of an antenna in a product identification area in one embodiment of the present disclosure.

FIG. 2 is a schematic view of an installation structure of an antenna in a product identification area in one embodiment of the present disclosure. As shown in FIG. 2, the plurality of antennas in the product identification area comprise a first antenna 1, a second antenna 2, a third antenna 3, and a fourth antenna 4.

In some embodiments of the present disclosure, as shown in FIG. 2, the first antenna 1 is opposite to the third antenna 3 at the same height, and the second antenna 2 is opposite to the fourth antenna 4 at the same height. The antennas 1, 3 and the antennas 2, 4 have a height interval of Δh.

In some embodiments of the present disclosure, the height interval Δh of the antennas may be determined by a passage width W and an antenna interval L, where the antenna interval is an interval between the first antenna 1 and the fourth antenna 4 in the axial direction of the passage.

In some embodiments of the present disclosure, the height interval Δh of the antennas may be determined by the formula (1).

$$\Delta h = \frac{\sqrt{6}}{3} L \quad (1)$$

In some embodiments of the present disclosure, the passage width W is recommended to be 1.2 m, and the antenna interval L is also 1.2 m. Thus, Δh may be determined to be 0.98 m, which is approximately 1 m by the formula (1).

The shapes of the antennas in the above-described embodiments of the present disclosure are not limited.

The antenna in the product identification area (antennas 1 to 4) of the above-described embodiments of the present disclosure form a relatively stable product identification area within the passage. As shown in FIGS. 1 and 2, when a customer passes through the identification area of the passage with products, the electromagnetic fields within the identification area are evenly distributed, without an obvious dead spot.

The antenna in the product identification areas of the above-described embodiments of the present disclosure are disposed in a three-dimensional manner, which helps to ensure full coverage of the identification area without dead spot, and may effectively control the distribution of electromagnetic fields and reduce the probability of false reading.

3. Antenna in the Product Verification Area

In some embodiments of the present disclosure, as shown in FIG. 1, the antenna in the product verification area may comprise a fifth antenna 5 and a sixth antenna 6, wherein the fifth antenna 5 and sixth antenna 6 are installed adjacent to the entrance of the passage, and the heights of the fifth antenna 5 and sixth antenna 6 are between the two groups of antennas 1, 3 and 2, 4. Similarly, the antenna 5 and the antenna 6 are connected to the control device outside the passage through radio frequency cables.

In some embodiments of the present disclosure, the antenna in the product verification areas (e.g., the fifth antenna 5 and the sixth antenna 6) have the same structure, and the patterns of the antenna in the product verification areas have a front-to-rear ratio of greater than a predetermined value.

In some embodiments of the present disclosure, the patterns of the fifth antenna 5 and sixth antenna 6 have a front-to-back ratio greater than 15 dB.

In some embodiments of the present disclosure, the antenna in the product verification area has a port output power lower than that of the antenna in the product identification area.

In some embodiments of the present disclosure, the fifth antenna 5 and sixth antenna 6 have an output power that is 5 dB lower than that of antennas 1 to 4.

In some embodiments of the present disclosure, the antenna in the product verification area is further configured to read a readable tag outside the passage.

In some embodiments of the present disclosure, as shown in FIG. 1, the antennas 5 and 6, a first photoelectric switch S1 and a second photoelectric switch S2 constitute a product verification area.

The above-described embodiments of the present disclosure creatively propose a product verification area configured to scan product tags that might be falsely read outside the passage and perform "subtraction" processing to further reduce the probability of false reading.

4. Photoelectric Switch

In some embodiments of the present disclosure, the product identification passage may further comprise at least one of a first photoelectric switch S1, a second photoelectric switch S2, a third photoelectric switch S3, or a fourth photoelectric switch S4.

The first photoelectric switch is arranged at the entrance of the product identification passage; the first photoelectric switch is configured to detect whether the user enters the product verification area, and to send a trigger signal to the control device in the case where the user enters the product verification area.

As shown in FIG. 1, the first photoelectric switch S1 is installed at the entrance of the passage to sense a customer entering the passage. When there is a customer entering the passage, the photoelectric switch S1 is triggered to upload a trigger signal to the control device, so that the control device issues a trigger instruction to the antennas 5-6 which in turn perform polling and scanning on the tags of the products carried by the customer.

The second photoelectric switch S2 is arranged between the product verification area and the product identification area of the product identification passage; the second photoelectric switch S2 is configured to detect whether the user enters the product identification area, and to send a trigger signal to the control device in the case where the user enters the product identification area.

As shown in FIG. 1, the second photoelectric switch S2 is installed behind the antennas 5 and 6. When the customer bypasses the photoelectric switch S2, a trigger signal is uploaded to the control device which in turn issues a trigger instruction to the antennas 1-4 such that the antennas perform polling and scanning the tags of the products carried by the customer. At the same time, the control device issues a trigger instruction to the antennas 5-6 to close the ports of the antenna 5 and 6.

The third photoelectric switch S3 is arranged between the product settlement area and the product identification area of the product identification passage; the third photoelectric switch is configured to detect whether the user enters the product settlement area, and to send a trigger signal to the control device in the case where the user enters the product settlement area.

As shown in FIG. 1, the third photoelectric switch (photoelectric switch S3) is installed behind the antennas 1-4. When the customer bypasses the photoelectric switch S3, a trigger signal is uploaded to the control device which in turn issues a trigger instruction to the antennas 1-4 to close the ports of the antennas 1-4. At the same time, the control device issues a trigger instruction to the antennas 5-6 to open the ports of the antennas 5-6.

The fourth photoelectric switch S4 is arranged at the exit of the product identification passage; the fourth photoelectric switch S4 is configured to detect whether a user leaves the product settlement area, and to send a trigger signal to the control device in the case where the user leaves the product settlement area.

As shown in FIG. 1, the fourth photoelectric switch S4 is installed behind the photoelectric switch S3. The area between the photoelectric switches S3 and S4 forms a settlement area in which the identity identification apparatus may be installed. When the customer bypasses the photoelectric switch S4, a trigger signal is uploaded to the control device which in turn checks the products carried by the customer and binds the products with the identity of the customer, so as to complete the settlement in the background.

In some embodiments of the present disclosure, the photoelectric switch may be implemented as a photoelectric sensor unit. For example: the first photoelectric switch may be implemented as a first photoelectric sensor unit, the second photoelectric switch may be implemented as a second photoelectric sensor unit, the third photoelectric switch may be implemented as a third photoelectric sensor unit, and the fourth photoelectric switch may be implemented as a fourth photoelectric sensor unit.

The four sets of photoelectric switches in the above-described embodiments of the present disclosure are flexibly disposed, to divide different areas within the passage, and may also control an ordered identification flow within the passage.

5. Control Device

The control device 40 is configured to instruct the antenna in the product verification area to collect the first product identification data of identified products in the case where the user enters the product verification area of the product identification passage; instruct the antenna in the product identification area to collect the second product identification data of identified products in the case where the user enters the product identification area of the product identification passage; instruct the antenna in the product verification area to collect the product verification data of identified products in the case where the user enters the product settlement area of the product identification passage; and determine the user product data based on the first product identification data, the second product identification data and the product verification data.

In some embodiments of the present disclosure, the control device is a core component of the present passage.

In some embodiments of the present disclosure, the control device may be implemented as a control cabinet placed outside the passage.

Figure 3:
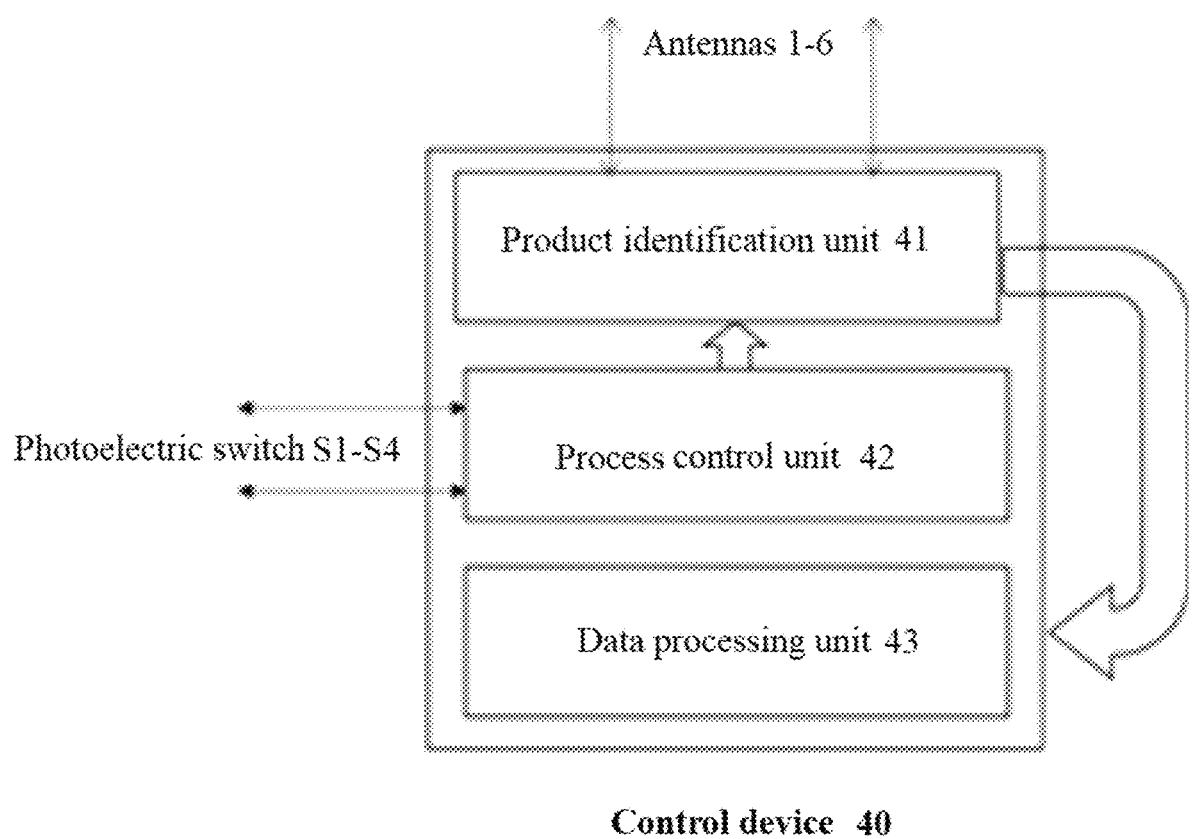
FIG. 3 is a schematic view of some embodiments of the control device of the present disclosure.

FIG. 3 is a schematic view of some embodiments of the control device 40 of the present disclosure. As shown in FIG. 3, the control device integrates functions such as product tag identification, process control and data processing, as shown in FIG. 3 below.

A product identification unit 41 is connected to the antennas 1 to 6 through the radio frequency ports, and configured to transmit and receive electromagnetic signals and send data to a data processing unit; the product identification unit receives the control signal of a process control unit and controls opening or closing of various antenna ports of the product identification unit.

In some embodiments of the present disclosure, the product identification unit 41 is configured to instruct the antenna in the product verification area to collect the first product identification data of identified products in the case where the process control unit determines that the user enters the product verification area of the product identification passage; to instruct the antenna in the product identification area to collect the second product identification data of identified products in the case where the process control unit determines that the user enters the product identification area of the product identification passage; and to instruct the antenna in the product verification area to collect the product verification data of identified products in the case where the process control unit determines that the user enters the product settlement area of the product identification passage.

The process control unit 42 is configured to receive the trigger signals of the photoelectric switches S1-S4, and to send related control instructions to the product identification unit.

In some embodiments of the present disclosure, the process control unit 42 is configured to determine whether the user enters the product verification area, the product identification area, or the product settlement area of the product identification passage.

The data processing unit 43 is configured to receive the product data collected by the product identification unit and perform a "subtraction" operation according to a certain algorithm.

In some embodiments of the present disclosure, the data processing unit 43 is configured to determine the user product data based on the first product identification data, the second product identification data and the product verification data.

Based on the control device provided by the above-described embodiments of the present disclosure, the functions such as data collection, process control and data processing may be integrated in the form of an external control cabinet. The above-described embodiments of the present disclosure, in which a modular design is used, is more conducive to installation and debugging of the device and helps to reduce the investment cost of the device.

The product identification passage provided based on the above-described embodiments of the present disclosure is an open product identification passage with divided areas that has been set forth for the first time in the present disclosure. The product identification passage of the above-described embodiment of the present disclosure is divided into three areas: a product identification area, a verification area and a settlement area. The product identification passage of the above-described embodiments of the present disclosure may scan the product repeatedly for multiple times in the product identification area and the product verification area, which may reduce the absent reading rate of the product to a certain extent; and the antenna deployment method of the product identification area further reduces the probability of absent reading. The product verification area of the above-described embodiment of the present disclosure greatly reduces the probability of false reading by scanning the product outside the passage. Overall, the product identification passage of the above-described embodiment of the present disclosure may significantly improve the accuracy of product identification.

Figure 4:
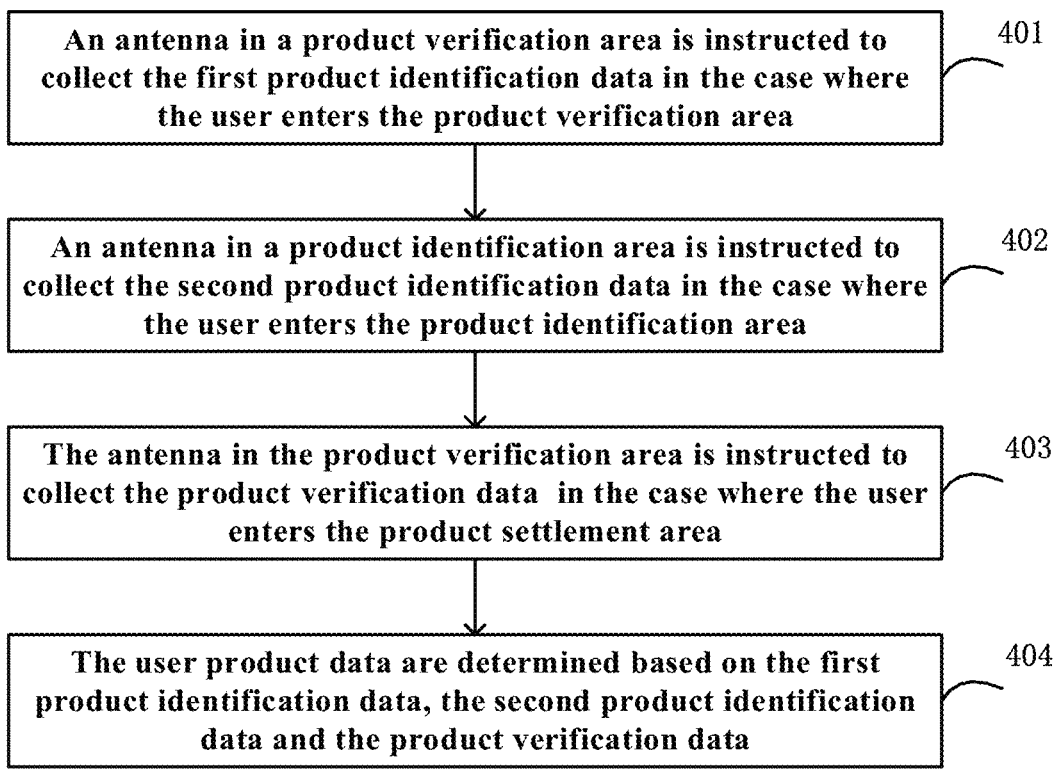
FIG. 4 is a schematic view of some embodiments of the product identification method of the present disclosure.

FIG. 4 is a schematic view of some embodiments of the product identification method of the present disclosure. Preferably, this embodiment may be executed by the control device described in the embodiments of FIG. 1 or FIG. 3 or the product identification passage described in the embodiments of FIG. 1 of the present disclosure. This method comprises the following steps 401-404.

In step 401, the antenna in the product verification area is instructed to collect the first product identification data of identified products in the case where the user enters the product verification area of the product identification passage.

In some embodiments of the present disclosure, the product identification method may further comprise: it is determined that the user enters the product verification area, and the antenna in the product verification area is instructed to start identifying the product in the case of receiving a trigger signal of the first photoelectric switch, and the first product identification data of identified products are collected before a trigger signal of the second photoelectric switch is received, wherein the first photoelectric switch is arranged at the entrance of the product identification passage.

In step 402, the antenna in the product identification area is instructed to collect the second product identification data of identified products in the case where the user enters the product identification area of the product identification passage.

In some embodiments of the present disclosure, the product identification method may further comprise: it is determined that the user enters the product identification area, and the antenna in the product verification area is instructed to turn off, and the antenna in the product identification area is instructed to start identifying the product in the case of receiving a trigger signal of the second photoelectric switch; and the second product identification data of identified products is collected before receiving a trigger signal of the third photoelectric switch, wherein the second photoelectric switch is arranged between the product verification area and the product identification area of the product identification passage.

In step 403, the antenna in the product verification area is instructed to collect the product verification data of identified products in the case where the user enters the product settlement area of the product identification passage.

In some embodiments of the present disclosure, the product identification method may further comprise the steps that: it is determined that the user enters the product settlement area, the antenna of the product identification area is instructed to be turned off, and the antenna of the verification area is instructed to start identifying the product in the case of receiving a trigger signal of the third photoelectric switch, and the product verification data of identified products is collected before receiving a trigger signal of the fourth photoelectric switch, wherein the third photoelectric switch is arranged between the product settlement area and the product identification area of the product identification passage.

In step 404, the user product data are determined based on the first product identification data, the second product identification data and the product verification data.

In some embodiments of the present disclosure, the product verification area is arranged at the entrance of the product identification passage, the product settlement area is arranged at the exit of the product identification passage, and the product identification area is arranged between the product verification area and the product settlement area.

In some embodiments of the present disclosure, the product identification method may further comprise the steps that: it is determined that the user has left the product settlement area, the antenna in the product verification area is instructed to turn off, and the product settlement is completed based on the user product data (the first product identification data, the second product identification data, and the product verification data) in the case of receiving a trigger signal of the fourth photoelectric switch, wherein the fourth photoelectric switch is arranged at the exit of the product identification passage.

In some embodiments of the present disclosure, the step 404 may comprise the step 4041 and 4042.

In step 4041, the first product identification data and the second product identification data are calculated for an union set.

In step 4042, the difference set between the union set and the product verification data is taken as the user product data.

Based on the product identification method provided by the above-described embodiments of the present disclosure, the reader antennas are reasonably disposed in different areas in the product identification passage dedicated to the unmanned supermarket with divided areas, and the false reading tags outside the passage are eliminated by using a "subtraction" operation, so that it is possible to reduce the false reading probability of the tags whilst reducing the tag absent reading phenomenon.

Figure 5:
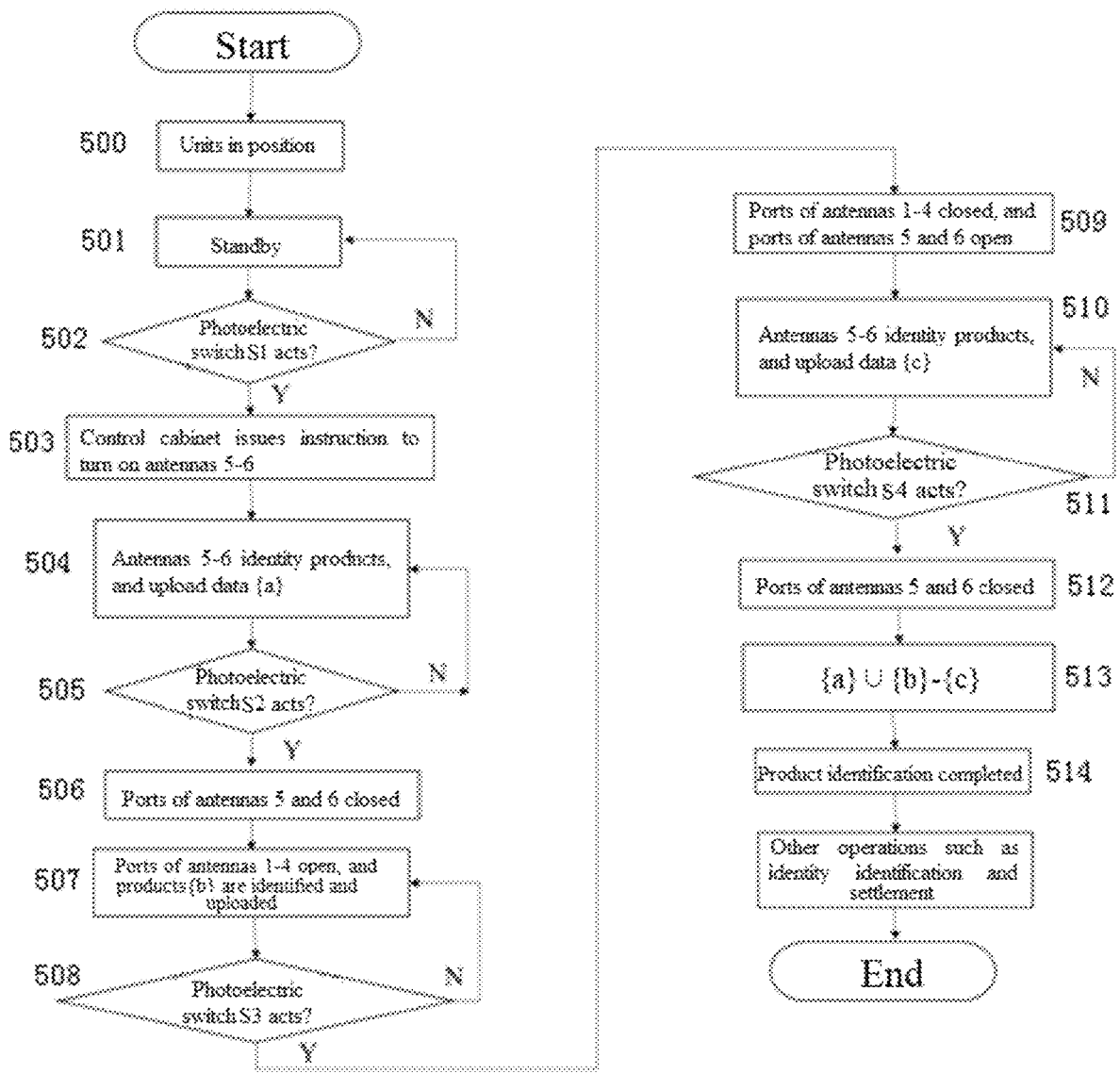
FIG. 5 is a schematic view of other embodiments of the product identification method of the present disclosure.

FIG. 5 is a schematic view of other embodiments of the product identification method of the present disclosure. Preferably, the present embodiment may be executed by the control device described in the embodiments of FIG. 1 or FIG. 3 or the product identification passage described in the embodiments of FIG. 1 of the present disclosure. In some embodiments of the present disclosure, the first photoelectric switch may be implemented as the first photoelectric sensor unit 1, the second photoelectric switch may be implemented as the second photoelectric sensor unit 2, the third photoelectric switch may be implemented as the third photoelectric sensor unit 3, and the fourth photoelectric switch may be implemented as the fourth photoelectric sensor unit 4.

The method in the embodiments of FIG. 5 may comprise the following steps 501-514.

In step 500, various constituent units of the product identification passage of the present disclosure are ready in position.

In step 501, the product identification passage is in a standby state when no one enters the passage.

In step 502, the first photoelectric sensor unit senses whether the user enters the product identification passage.

In step 503, when the customer enters the passage, the first photoelectric sensor unit senses that someone bypasses, and then sends a trigger signal to the process control unit of the control device; after judgment, the process control unit of the control device sends an instruction to the product identification unit, such that the product identification unit sends an instruction to the open the ports of antenna 5 and 6 which in turn start identifying products.

In step 504, the antenna 5 and 6 identify the products, and before action of the second photoelectric sensor unit, the first product identification data of identified products, that is, the product combination {a} are collected; and the first product identification data are uploaded to the processing unit of the control device data.

In step 505, the second photoelectric sensor unit senses whether a customer bypasses.

In step 506, the second photoelectric sensor unit senses that a customer bypasses, and then sends a trigger signal to the process control unit of the control device; after judgment, the control device chooses to turn on the antennas 1 to 4, and turn off the antennas 5 and 6 at the same time.

In step 507, the antennas 1 to 4 comprehensively identify the products, and before action of the photoelectric sensor unit 3, the second product identification data of identified products, that is, the product combination {b} are collected; and the second product identification data are uploaded to the data processing unit.

In step 508, the photoelectric sensor unit 3 senses whether a customer bypasses.

In step 509, the photoelectric sensor unit 3 senses that a customer bypasses, and then sends a trigger signal to the process control unit, and after judgment, chooses to turn on the antennas 5 and 6, and turn off the antennas 1 to 4 at the same time.

In step 510, the antennas 5 and 6 identify the products. Since the antennas 5 and 6 have a high front-to-rear ratio, the antennas 5-6 cannot read the products behind the antenna, but can only identify the products around the passage. In addition, by controlling an output power of the antenna port, the antennas 5-6 have a controllable identification range. Before action of the fourth photoelectric sensor unit, the product verification data of identified products, that is, the product combination {c} are collected, and the product verification data are uploaded to the data processing unit of the control device.

In step 511, the fourth photoelectric sensor unit senses whether a customer bypasses.

In step 512, the fourth photoelectric sensor unit senses that a customer bypasses, and then sends a trigger signal to the process control unit, and turns off the antennas 5-6 after judgment.

In step 513, the data processing unit processes the received product data {a}, {b}, {c}, and performs an operation $M=\{a\}\cap\{b\}-\{c\}$, in which M is taken as the identified products within the passage.

For example: if {a}={1,2,4,4,5,7}, {b}={2,3,4,2,5,7}, and {c}={1,4}, then {a}∩{b}={1,2,2,3,4,4,5,7}, and $M=\{a\}\cap\{b\}-\{c\}=\{2,2,3,4, 5,7\}$, wherein, {1,4} represents the false reading products around the passage, and {a}∩{b} represents the products that have been scanned twice within the passage, so that the above-described embodiment of the present disclosure may obtain the absent reading products by scanning to a certain extent.

In step 514, the product identification is completed; the settlement of the products is completed based on the data group M processed by the data processing unit and operations such as identity verification and settlement.

The product identification passage of the above-described embodiment of the present disclosure is divided into three areas: a product identification area, a product verification area and a product settlement area.

The antenna in the product identification areas of the above-described embodiments of the present disclosure are disposed in a three-dimensional manner, which helps to ensure full coverage of the identification area without dead spot, and may effectively control the distribution of electromagnetic fields and reduce the probability of false reading.

The above-described embodiments of the present disclosure creatively propose a product verification area configured to scan product tags that might be falsely read outside the passage and perform "subtraction" processing to further reduce the probability of false reading.

The four sets of photoelectric switches in the above-described embodiments of the present disclosure which are flexibly disposed, may also control an ordered identification flow within the passage, in addition to division of different areas within the passage.

In the external control device of the above-described embodiments of the present disclosure, the functions such as data collection, process control and data processing are integrated in the form of an external control cabinet, and a modular design is used, which is more conducive to installation and debugging of the device and helps to reduce the investment cost of the device.

The product identification passage of the above-described embodiments of the present disclosure may scan the product repeatedly for multiple times in the product identification area and the product verification area, which may reduce the absent reading rate of the product to a certain extent; and the antenna deployment method of the product identification area further reduces the probability of absent reading. The product verification area of the above-described embodiment of the present disclosure may greatly reduce the probability of false reading by scanning the product outside the passage. Overall, the product identification passage of the above-described embodiment of the present disclosure may significantly improve the accuracy of product identification.

Figure 6:
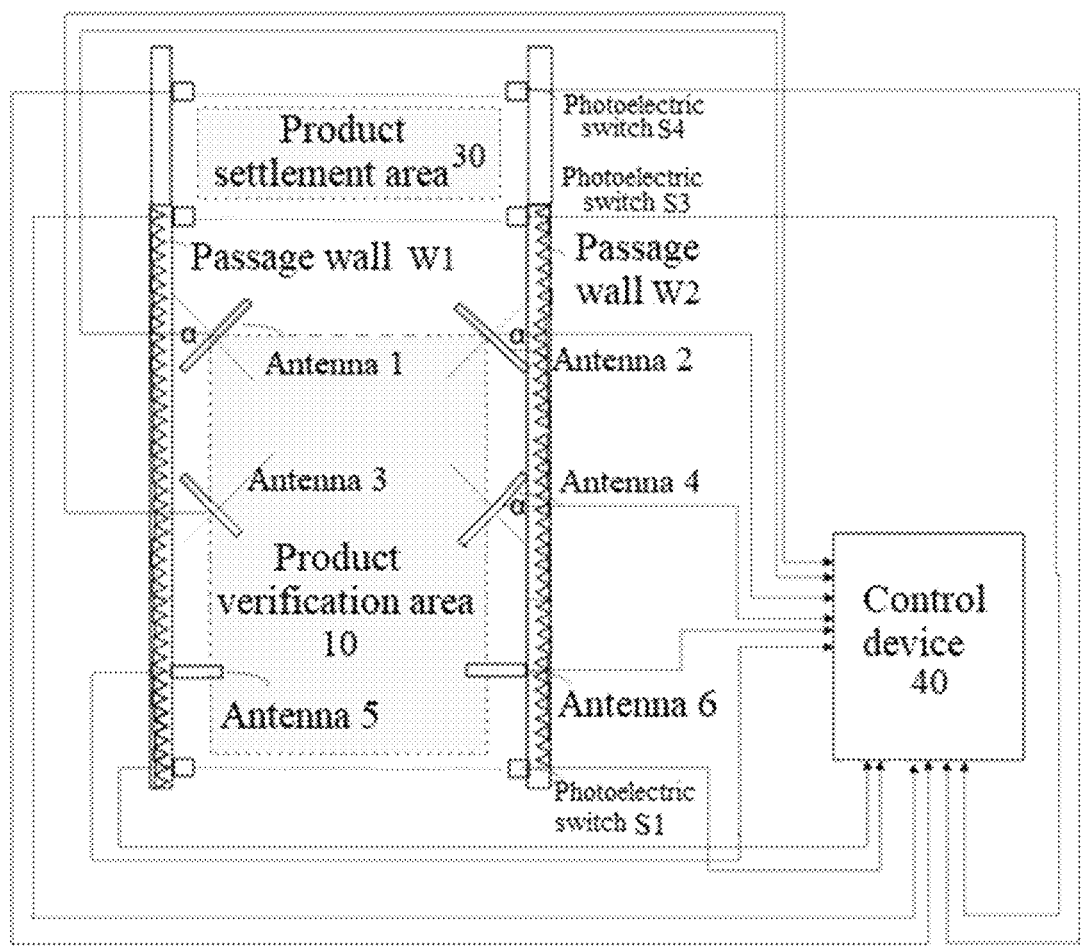
FIG. 6 is a schematic view of other embodiments of the product identification passage of the present disclosure.

FIG. 6 is a schematic view of other embodiments of the product identification passage of the present disclosure. As shown in FIG. 6, the product identification passage comprises two passage walls, such that a product verification area and a product settlement area are sequentially arranged within the passage walls from the passage entrance to the passage exit.

Various constituent parts of the product identification passage of the present disclosure will be described below in conjunction with the accompanying drawings.

1. Passage Wall

The product identification passage of the present disclosure is an open passage, wherein the body structure of the product identification passage of the present disclosure consists in two passage walls (a passage wall W1 and a passage wall W2 as shown in FIG. 1).

In some embodiments of the present disclosure, an electromagnetic wave absorbing material is loaded within the passage wall. Accordingly, the passage wall can absorb redundant electromagnetic fields, reduce electromagnetic reflection within the passage, limit unstable electromagnetic radiation, and produce the effect of purifying the electromagnetic environment of the passage.

In some embodiments of the present disclosure, a gate and an identity identification apparatus may be installed at the passage exit. The product identification passage of the present disclosure combines the gate and the identity identification apparatus to collectively form the product settlement passage of the present disclosure. Since the above-described embodiments of the present disclosure mainly describe the product identification function, the functions of the gate and the identity identification apparatus will not be elaborated in detail here.

2. Antenna in the Product Verification Areas

In some embodiments of the present disclosure, as shown in FIG. 6, the antenna in the product verification area is arranged inside the passage.

In some embodiments of the present disclosure, the antenna in the product verification area may comprise multiple pairs of antennas in the product verification areas respectively arranged on two passage walls.

In some embodiments of the present disclosure, the antenna in the product verification area is connected to a control device outside the passage through radio frequency cables.

In some embodiments of the present disclosure, the antenna in the product verification areas may only comprise a first antenna 1, a second antenna 2, a third antenna 3, and a fourth antenna 4 similar to the embodiments of FIGS. 1 and 2.

In other embodiments of the present disclosure, the antenna in the product verification areas may only comprise a fifth antenna 5 and a sixth antenna 6 similar to the embodiment of FIG. 1.

In other embodiments of the present disclosure, as shown in FIG. 6, the antenna in the product verification areas may comprise a first antenna 1, a second antenna 2, a third antenna 3, a fourth antenna 4, a fifth antenna 5 and a sixth antenna 6 similar to the embodiment of FIG. 1.

The antenna in the product verification areas of the above-described embodiments of the present disclosure are disposed in a three-dimensional manner, which helps to ensure full coverage of the identification area without dead spot, and may effectively control the distribution of electromagnetic fields and reduce the probability of false reading.

The above-described embodiments of the present disclosure creatively propose a product verification area configured to scan product tags that might be falsely read outside the passage and perform "subtraction" processing to further reduce the probability of false reading.

3. Photoelectric Switch

In some embodiments of the present disclosure, the product identification passage may further comprise at least one of a first photoelectric switch S1, a third photoelectric switch S3, or a fourth photoelectric switch S4.

The first photoelectric switch is arranged at the entrance of the product identification passage; the first photoelectric switch is configured to detect whether the user enters the product verification area, and to send a trigger signal to the control device in the case where the user enters the product verification area.

As shown in FIG. 6, the first photoelectric switch S1 is installed at the entrance of the passage to sense whether a customer enters the passage. When there is a customer entering the passage, the first photoelectric switch S1 is triggered to upload a trigger signal to the control device, so that the control device issues a trigger instruction to the antennas 1-6 which in turn perform polling and scanning on the tags of the products carried by the customer.

The third photoelectric switch S3 is arranged between the product settlement area and the product verification area of the product verification passage; the third photoelectric switch is configured to detect whether the user enters the product settlement area, and to send a trigger signal to the control device in the case where the user enters the product settlement area.

As shown in FIG. 6, the third photoelectric switch S3 is installed behind the antennas 1-4. When the customer bypasses the photoelectric switch S3, a trigger signal is uploaded to the control device which in turn issues a trigger instruction to the antennas 1-6, so that the ports of the antennas 1-6 remain opened.

The fourth photoelectric switch S4 is arranged at the exit of the product identification passage; the fourth photoelectric switch S4 is configured to detect whether a user leaves the product settlement area, and to send a trigger signal to the control device in the case where the user leaves the product settlement area.

As shown in FIG. 6, the fourth photoelectric switch S4 is installed behind the photoelectric switch S3. The area between the photoelectric switches S3 and S4 forms a settlement area in which the identity identification apparatus may be installed. When the customer bypasses the photoelectric switch S4, a trigger signal is uploaded to the control device which in turn checks the products carried by the customer and binds the products with the identity of the customer, so as to complete the settlement in the background.

In some embodiments of the present disclosure, the photoelectric switch may be implemented as a photoelectric sensor unit. For example: the first photoelectric switch may be implemented as a first photoelectric sensor unit, the second photoelectric switch may be implemented as a second photoelectric sensor unit, the third photoelectric switch may be implemented as a third photoelectric sensor unit, and the fourth photoelectric switch may be implemented as a fourth photoelectric sensor unit.

The three sets of photoelectric switches in the above-described embodiments of the present disclosure are flexibly disposed, to divide different areas within the passage, and may also control an ordered identification flow within the passage.

4. Control Device

The control device 40 is configured to instruct the antenna in the product verification area to collect the first product identification data of identified products in the case where the user enters the product verification area of the product identification passage; instruct the antenna in the product verification area to collect the product verification data of identified products in the case where the user enters the product settlement area of the product identification passage; and determine the user product data based on the first product identification data and the product verification data.

In some embodiments of the present disclosure, the control device 40 is a core component of the present passage.

In some embodiments of the present disclosure, the control device 40 may be implemented as a control cabinet placed outside the passage.

Figure 7:
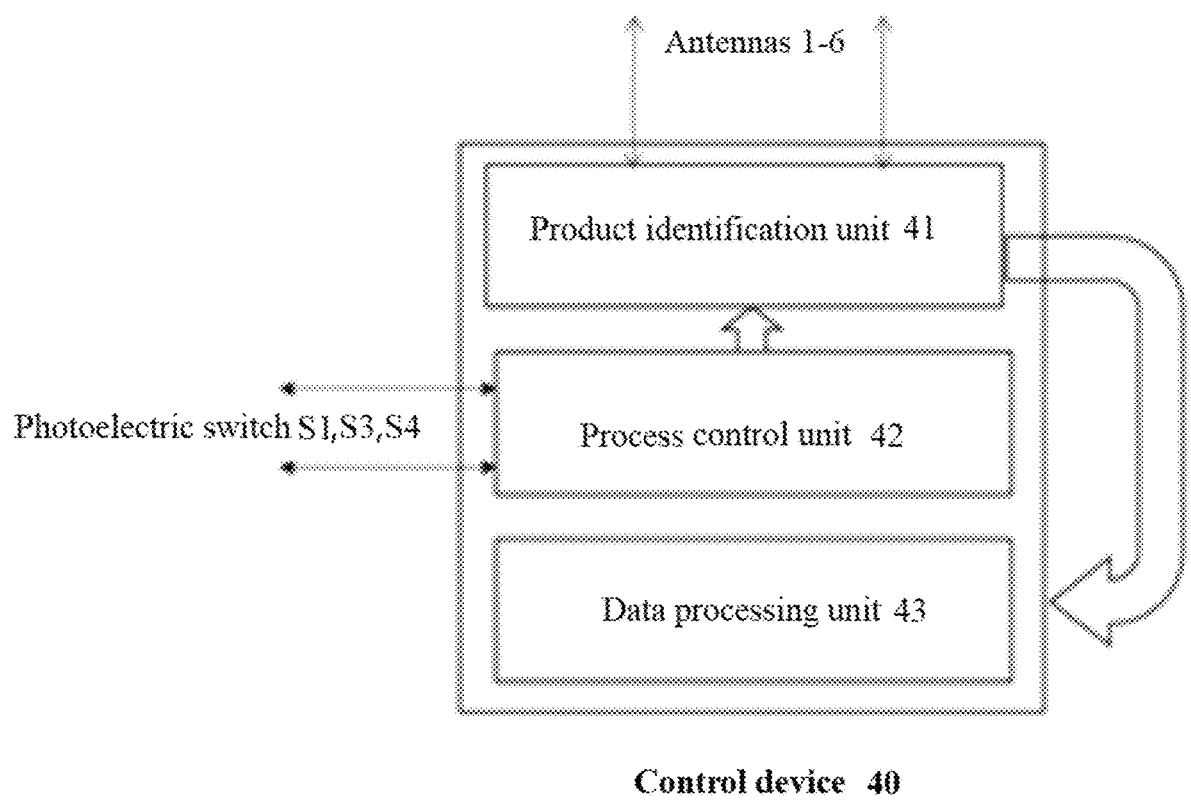
FIG. 7 is a schematic view of other embodiments of the control device of the present disclosure.

FIG. 7 is a schematic view of other embodiments of the control device of the present disclosure. As shown in FIG. 7, the control device 40 in the embodiment of FIG. 6 integrates functions such as product tag identification, process control and data processing, as shown in FIG. 7 below.

A product identification unit 41 is connected to the antennas 1 to 6 through the radio frequency ports, and configured to transmit and receive electromagnetic signals and send data to a data processing unit; the product identification unit receives the control signal of a process control unit and controls opening or closing of various antenna ports of the product identification unit.

In some embodiments of the present disclosure, the product identification unit 41 is configured to instruct the antenna in the product verification area to collect the first product identification data of identified products in the case where the process control unit determines that the user enters the product verification area of the product identification passage; and to instruct the antenna in the product verification area to collect the product verification data of identified products in the case where the process control unit determines that the user enters the product settlement area of the product identification passage.

The process control unit 42 is configured to receive the trigger signals of the photoelectric switches S1 and S3-S4, and send related control instructions to the product identification unit.

In some embodiments of the present disclosure, the process control unit 42 is configured to determine whether the user enters the product verification area or the product settlement area of the product identification passage.

The data processing unit 43 is configured to receive the product data collected by the product identification unit and perform a "subtraction" operation according to a certain algorithm.

In some embodiments of the present disclosure, the data processing unit 43 is configured to determine the user product data based on the first product identification data and the product verification data.

Based on the control device provided by the above-described embodiments of the present disclosure, the functions such as data collection, process control and data processing may be integrated in the form of an external control cabinet. The above-described embodiments of the present disclosure, in which a modular design is used, is more conducive to installation and debugging of the device and helps to reduce the investment cost of the device.

The product identification passage provided based on the above-described embodiments of the present disclosure is an open product identification passage with divided areas that has been set forth for the first time in the present disclosure. The product identification passage of the above-described embodiment of the present disclosure is divided into two areas: a product identification area and a settlement area. The product identification passage of the above-described embodiments of the present disclosure may scan the product repeatedly for multiple times in the product verification area, which may reduce the absent reading rate of the product to a certain extent; and the antenna deployment method of the product verification area further reduces the probability of absent reading. The product verification area of the above-described embodiment of the present disclosure greatly reduces the probability of false reading by scanning the product outside the passage. Overall, the product identification passage of the above-described embodiment of the present disclosure may significantly improve the accuracy of product identification.

Figure 8:
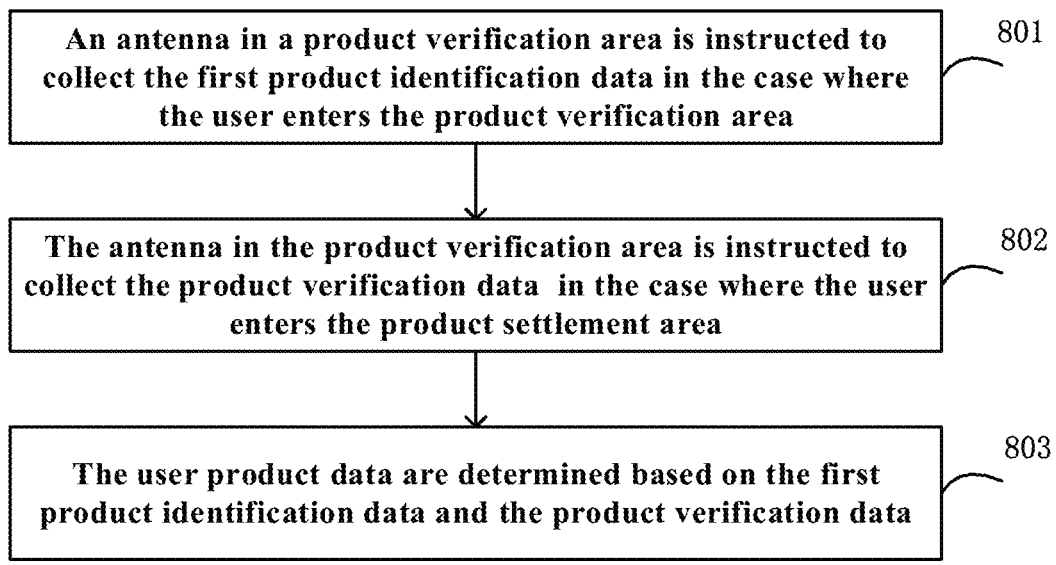
FIG. 8 is a schematic view of still other embodiments of the product identification method of the present disclosure.

FIG. 8 is a schematic view of other embodiments of the product identification method of the present disclosure. Preferably, the present embodiment may be executed by the control device described in the embodiment of FIG. 6 or FIG. 7 of the present disclosure or the product identification passage described in the embodiment of FIG. 7 of the present disclosure. This method comprises the following steps 801-803.

In step 801, the antenna in the product verification area is instructed to collect the first product identification data of identified products {a} in the case where the user enters the product verification area of the product identification passage.

In some embodiments of the present disclosure, the product identification method may further comprise: it is determined that the user enters the product verification area, and the antenna in the product verification area is instructed to start identifying the product in the case of receiving a trigger signal of the first photoelectric switch, and the first product identification data {a} of identified products are collected before a trigger signal of the third photoelectric switch is received, wherein the first photoelectric switch is arranged at the entrance of the product identification passage, and the third photoelectric switch is arranged between the product settlement area and the product verification area of the product identification passage.

In step 802, the antenna in the product verification area is instructed to collect the product verification data {c} of identified products in the case where the user enters the product settlement area of the product identification passage.

In some embodiments of the present disclosure, the product identification method may further comprise: it is determined that the user enters the product settlement area, and the antenna in the product verification area is instructed to start identifying the product in the case of receiving a trigger signal of the third photoelectric switch, and the product verification data {c} of identified products are collected before a trigger signal of the fourth photoelectric switch is received, wherein the fourth photoelectric switch is arranged at the exit of the product identification passage.

In step 803, the user product data M are determined based on the first product identification data {a} and the product verification data {c}.

In some embodiments of the present disclosure, the step 803 may comprise: the difference set between the first product identification data {a} and the product verification data {c} is taken as user product data M, that is, M={a}-{c}.

In some embodiments of the present disclosure, the product identification method may further comprise: it is determined that the user has left the product settlement area, the antenna in the product verification area is instructed to turn off, and the product settlement is completed based on the user product data (the first product identification data and the product verification data) in the case of receiving a trigger signal of the fourth photoelectric switch.

Based on the product identification method provided by the above-described embodiments of the present disclosure, the reader antennas are reasonably disposed in different areas in the product identification passage dedicated to the unmanned supermarket with divided areas, and the false reading tags outside the passage are eliminated by using a "subtraction" operation, so that it is possible to reduce the false reading probability of the tags whilst reducing the tag absent reading phenomenon.

Figure 9:
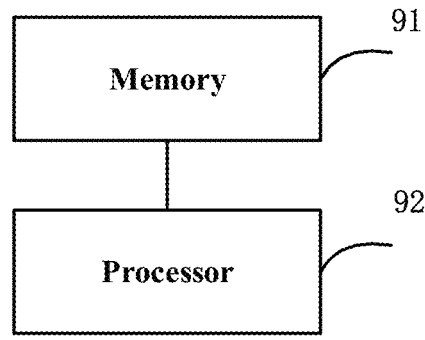
FIG. 9 is a schematic view of still other embodiments of the control device of the present disclosure.

FIG. 9 is a schematic view of other embodiments of the control device of the present disclosure. As shown in FIG. 9, the control device may comprise a memory 91 and a processor 92.

The memory 91 is configured to store instructions.

The processor 92 is configured to execute the instructions, so that the control device performs operations for implementing the product identification method described in any of the above-described embodiments (for example any of the embodiments in FIGS. 4-5 and FIG. 8).

Based on the control device provided by the above-described embodiments of the present disclosure, the reader antennas are reasonably disposed in different areas in the product identification passage dedicated to the unmanned supermarket with divided areas, and the false reading tags outside the passage are eliminated by using a "subtraction" operation, so that it is possible to reduce the false reading probability of the tags whilst reducing the tag absent reading phenomenon.

According to another aspect of the present disclosure, a product settlement passage is provided. The product settlement passage comprises an identity identification apparatus and the product identification passage as described in any of the above-described embodiments (for example the embodiments in FIG. 1 or FIG. 6), wherein:

The identity identification apparatus is arranged in the product settlement area of the product identification passage.

The identity identification apparatus is configured to identify the identity of a user; and to send the identity information of the user to the control device of the product identification passage.

The control device of the product identification passage is configured to bind the user product data with the user identity to complete the product settlement.

In some embodiments of the present disclosure, the product settlement passage may further comprise a gate.

The gate is arranged in the product settlement area of the product identification passage.

The control device of the product identification passage is also configured to instruct the gate to open after the product settlement is completed.

The product settlement passage of the above-described embodiments of the present disclosure may scan the product repeatedly for multiple times in the product identification area and the product verification area, which may reduce the absent reading rate of the product to a certain extent; and the antenna deployment method of the product identification area further reduces the probability of absent reading. The product verification area of the above-described embodiment of the present disclosure greatly reduces the probability of false reading by scanning the product outside the passage. Overall, the product identification passage of the above-described embodiment of the present disclosure may significantly improve the accuracy of product identification.

According to another aspect of the present disclosure, a computer readable storage medium is provided. The computer readable storage medium stores computer instructions that, when executed by a processor, implement the product identification method according to any of the above-described embodiments (for example any of the above-described embodiments in FIGS. 4-5 and 8). For example, the computer readable storage medium is a non-transitory computer readable storage medium.

Based on the computer readable storage medium provided by the above-described embodiments of the present disclosure, the reader antennas are reasonably disposed in different areas in the product identification passage dedicated to the unmanned supermarket with divided areas, and the false reading tags outside the passage are eliminated by using a "subtraction" operation, so that it is possible to reduce the false reading probability of the tags whilst reducing the tag absent reading phenomenon.

The control device described above may be implemented as a general purpose processor, a programmable logic controller (PLC), a digital signal processor (DSP), an application specific integrated circuit (ASIC), a field-programmable gate array (FPGA) or other programmable logic devices, discrete gates or transistor logic devices, discrete hardware assemblies or any proper combination thereof, which is configured to perform the functions described in the present application.

Heretofore, the present disclosure has been described in detail. Some details well known in the art are not described to avoid obscuring the concept of the present disclosure. According to the above description, those skilled in the art would fully know how to implement the technical solutions disclosed herein.

Those of ordinary skill in the art may understand that all or some of the steps in the above-described embodiments may be implemented by hardware, or by hardware related to program instructions. The programs may be stored in a computer-readable storage medium. The storage above-described medium as mentioned may be read-only memory, magnetic disk or optical disk, and the like. Descriptions of the present disclosure, which are made for purpose of illustration and depiction, are not absent with omissions or limiting the present disclosure to the forms as disclosed. Many modifications and variations are apparent for those skilled in the art.

The embodiments are selected and described in order to better explain the principles and actual application of the present disclosure, and enable those skilled in the art to understand the present disclosure so as to design various embodiments adapted to particular purposes and comprising various modifications.

What is claimed is:

1. A product identification method, comprising:
   instructing an antenna in a product verification area to collect first product identification data of identified products in a case where a user enters the product verification area of a product identification passage, wherein the antenna in the product verification area has at least one of the following settings: a pattern of the antenna in the product verification area has a front-to-rear ratio greater than a predetermined value, or the antenna in the product verification area has a port output power lower than that of an antenna in a product identification area;
   instructing the antenna in the product verification area to collect product verification data of identified products in the case where the user enters a product settlement area of the product identification passage; and
   determining user product data based on the first product identification data and the product verification data,
   wherein the determining the user product data based on the first product identification data and the product verification data comprises:
   taking a difference set between the first product identification data and the product verification data as the user product data.

2. The product identification method according to claim 1, wherein
   the product verification area is arranged at an entrance of the product identification passage, and
   the product settlement area is arranged at an exit of the product identification passage.

3. The product identification method according to claim 1, further comprising:
   instructing the antenna in the product identification area to collect second product identification data of identified products in the case where the user enters the product identification area of the product identification passage, wherein the product identification area is arranged between the product verification area and the product settlement area.

4. The product identification method according to claim 3, wherein the determining the user product data based on the first product identification data and the product verification data comprises:
determining the user product data based on the first product identification data, the second product identification data, and the product verification data.

5. The product identification method according to claim 4, wherein the determining the user product data based on the first product identification data, the second product identification data, and the product verification data comprises:
calculating a union set of the first product identification data and the second product identification data; and
taking a difference set between the union set and the product verification data as the user product data.

6. The product identification method according to claim 1, further comprising:
determining that the user enters the product verification area in the case of receiving a trigger signal of a first photoelectric switch,
wherein the first photoelectric switch is arranged at an entrance of the product identification passage.

7. The product identification method according to claim 3, further comprising:
determining that the user enters the product identification area, and
instructing the antenna in the product verification area to turn off in the case of receiving a trigger signal of a second photoelectric switch,
wherein the second photoelectric switch is arranged between the product verification area and the product identification area of the product identification passage.

8. The product identification method according to claim 1, further comprising:
determining that the user enters the product settlement area in the case of receiving a trigger signal of a third photoelectric switch,
wherein the third photoelectric switch is arranged in front of the product settlement area of the product identification passage.

9. The product identification method according to claim 1, further comprising:
determining that the user has left the product settlement area, instructing the antenna in the product verification area to turn off, and
completing product settlement based on the user product data in the case of receiving a trigger signal of a fourth photoelectric switch,
wherein the fourth photoelectric switch is arranged at an exit of the product identification passage.

10. A control device, comprising:
a memory configured to store instructions; and
a processor configured to execute the instructions, so that the control device performs operations for implementing a product identification method, comprising:
instructing an antenna in a product verification area to collect first product identification data of products that can be identified in a case where a user enters the product verification area of a product identification passage, wherein the antenna in the product verification area has at least one of the following settings: a pattern of the antenna in the product verification area has a front-to-rear ratio greater than a predetermined value, or the antenna in the product verification area has a port output power lower than that of an antenna in a product identification area;
instructing the antenna in the product verification area to collect product verification data of products that can be identified in the case where the user enters a product settlement area of the product identification passage; and
determining user product data based on the first product identification data and the product verification data,
wherein the determining the user product data based on the first product identification data and the product verification data comprises:
taking a difference set between the first product identification data and the product verification data as the user product data.

11. A product identification passage, comprising:
the control device according to claim 10; and
the antenna in the product verification area,
wherein the product verification area and the product settlement area are arranged in the product identification passage.

12. The product identification passage according to claim 11, further comprising the product identification area and the antenna in the product identification area, wherein:
the product identification area is arranged between the product verification area and the product settlement area; and
the control device is further configured to:
instruct the antenna in the product identification area to collect second product identification data of identified products in the case where the user enters the product identification area of the product identification passage, and
determine the user product data based on the first product identification data, the second product identification data, and the product verification data.

13. The product identification passage according to claim 12, wherein
the antenna in the product identification area comprises a plurality of antennas in the product identification area, and
the plurality of antennas in the product identification area have at least one of the following settings:
the plurality of antennas in the product identification area are spaced at predetermined height intervals;
antenna surfaces of the plurality of antennas in the product identification area are installed at a predetermined angle with respect to a passage wall;
the plurality of antennas in the product identification area have a polling operation controlled by the control device; or
the plurality of antennas in the product identification area are all a same type of circular polarization antenna.

14. The product identification passage according to claim 13, wherein
the plurality of antennas in the product identification area comprises a first antenna, a second antenna, a third antenna, and a fourth antenna,
the first antenna is opposite to the third antenna at a same height, and
the second antenna is opposite to the fourth antenna at a same height.

15. The product identification passage according to claim 12, wherein
the antenna in the product verification area is further configured to read a readable tag outside the product identification passage.

16. The product identification passage according to claim 12, further comprising at least one of a first photoelectric switch, a second photoelectric switch, a third photoelectric switch, or a fourth photoelectric switch, wherein:
the first photoelectric switch is arranged at an entrance of the product identification passage, and is configured to:
detect whether the user enters the product verification area, and
send a trigger signal to the control device in the case where the user enters the product verification area;
the second photoelectric switch is arranged between the product verification area and the product identification area of the product identification passage, and is configured to:
detect whether the user enters the product identification area, and
send a trigger signal to the control device in the case where the user enters the product identification area;
the third photoelectric switch is arranged in front of the product settlement area of the product identification passage, and is configured to:
detect whether the user enters the product settlement area, and
send a trigger signal to the control device in the case where the user enters the product settlement area; and
the fourth photoelectric switch is arranged at an exit of the product identification passage, and is configured to:
detect whether the user leaves the product settlement area, and
send a trigger signal to the control device in the case where the user leaves the product settlement area.

17. A product settlement passage comprising:
the product identification passage according to claim 11, including the control device; and
an identity identification apparatus arranged in the product settlement area of the product identification passage, and configured to:
identify an identity of the user, and
send identity information of the user to the control device of the product identification passage,
wherein the control device of the product identification passage is configured to bind user product data with the identity of the user to complete product settlement.

18. The product settlement passage according to claim 17, further comprising:
a gate arranged in the product settlement area of the product identification passage,
wherein the control device of the product identification passage is also configured to instruct the gate to open after the product settlement is completed.

19. A non-transitory computer readable storage medium, wherein the non-transitory computer readable storage medium stores computer instructions which, when executed by a processor, implement a product identification method, comprising:
instructing an antenna in a product verification area to collect first product identification data of identified products in a case where a user enters the product verification area of a product identification passage, wherein the antenna in the product verification area has at least one of the following settings: a pattern of the antenna in the product verification area has a front-to-rear ratio greater than a predetermined value, or the antenna in the product verification area has a port output power lower than that of an antenna in a product identification area;
instructing the antenna in the product verification area to collect product verification data of identified products in the case where the user enters a product settlement area of the product identification passage; and
determining user product data based on the first product identification data and the product verification data,
wherein the determining the user product data based on the first product identification data and the product verification data comprises:
taking a difference set between the first product identification data and the product verification data as the user product data.

* * * * *